United States Patent [19]

Tojo et al.

[11] Patent Number: 5,076,967
[45] Date of Patent: Dec. 31, 1991

[54] SEMICONDUCTIVE RUBBER FOAM

[75] Inventors: Tetsuo Tojo; Yoshiharu Kikuchi; Keiji Okada, all of Ichihara, Japan

[73] Assignee: Mitsui Petrochemical Industries, Ltd., Tokyo, Japan

[21] Appl. No.: 668,050

[22] Filed: Mar. 12, 1991

[30] Foreign Application Priority Data

Mar. 13, 1990 [JP] Japan .................................. 2-60094

[51] Int. Cl.$^5$ .............................................. H01B 1/06
[52] U.S. Cl. .................................... 252/511; 252/510; 521/82; 521/142; 521/143; 521/144; 521/145; 521/96
[58] Field of Search .................. 252/511, 510; 521/96, 521/82, 143, 144

[56] References Cited

U.S. PATENT DOCUMENTS

| | | | |
|---|---|---|---|
| 3,816,347 | 6/1974 | Luh | 252/511 |
| 3,963,647 | 6/1976 | Straub | 252/511 |
| 4,127,699 | 11/1978 | Aumiller et al. | 252/511 |
| 4,431,575 | 2/1984 | Fujie et al. | 252/511 |
| 4,525,297 | 6/1985 | Yamane et al. | 252/511 |
| 4,719,039 | 1/1988 | Leonardi | 252/511 |
| 4,795,763 | 1/1989 | Gluck et al. | 521/917 |
| 4,800,126 | 1/1989 | Leonardi | 252/511 |
| 4,801,484 | 1/1989 | Yao et al. | 521/81 |
| 4,888,134 | 12/1989 | Kleitz et al. | 252/511 |

*Primary Examiner*—Morton Foelak
*Attorney, Agent, or Firm*—Sherman and Shalloway

[57] ABSTRACT

Disclosed is a semiconductive rubber foam having a volume resistivity that can be controlled to a practical level and retaining an initial softness (hardness) even after the lapse of time. This semiconductor rubber foam is composed of a molded article obtained by curing and foaming a rubber composition comprising (A) 100 parts by weight of a chlorinated ethylene/α-olefin copolymer rubber and (B) 10 to 50 parts by weight of carbon black. The volume resistivity of this semiconductive rubber foam has is in the range of from $10^5$ to $10^{11}$ Ω-cm.

12 Claims, No Drawings

SEMICONDUCTIVE RUBBER FOAM

BACKGROUND OF THE INVENTION

(1) Field of the Invention

The present invention relates to a semiconductive rubber foam. More particularly, the present invention relates to a semiconductive rubber foam composed of a chlorinated ethylene/α-olefin copolymer having a volume resistivity of $10^5$ to $10^{11}$ Ω-cm as the foam, which is excellent in heat aging resistance and ozone resistance and retains the initial softness even after the lapse of time without breaking by ozone deterioration.

(2) Description of the Related Art

The electrophotographic printing process is generally adopted for a copying machine, a laser printer and the like. Since electric charging is utilized for the mechanism in these machines, electric characteristics are often limited even in a delivery roll.

A chloroprene rubber has heretofore been used for such rolls.

However, a chloroprene foamed body is defective in that thermal deterioration is caused at a used atmospheric temperature or deterioration is caused by ozone present in a used atmosphere, and the foamed body becomes rigid with the lapse of time and paper-feeding performances are degraded.

Accordingly, use of a foamed rubber roll prepared by using an ethylene/propylene rubber EPDM has been tried. However, in this case, it is difficult to control the volume resistivity though the initial softness can be retained even after the lapse of time, and it has been found that this foamed rubber roll, therefore, cannot be put into practical use.

SUMMARY OF THE INVENTION

It is therefore a primary object of the present invention to overcome the foregoing disadvantages and provide a semiconductive rubber foam in which the volume resistivity can be practically controlled and the initial softness can be retained even after the lapse of time.

More specifically, in accordance with the present invention there is provided a semiconductive rubber foam composed of a molded body obtained by molding a rubber composition comprising (A) 100 parts by weight of a chlorinated ethylene/α-olefin copolymer rubber having a chlorine content of 20 to 40% by weight and a Mooney viscosity [$ML_{1+4}(121°\,C.)$] of 10 to 190 and (B) 10 to 50 parts by weight of carbon black as indispensable components by using a curing agent and a foaming agent, the volume resistivity of the foam being $10^5$ to $10^{11}$ Ω-cm.

DETAILED DESCRIPTION OF THE PREFERRED EMBODIMENTS

The chlorinated ethylene/α-olefin copolymer rubber and carbon black used in the present invention will now be described.

Chlorinated Ethylene/α-Olefin Copolymer Rubber

The chlorinated ethylene/α-olefin copolymer rubber can be obtained by chlorinating an ethylene/α-olefin copolymer rubber.

In the ethylene/α-olefin copolymer rubber before the chlorination, an α-olefin having 3 to 10 carbon atoms is preferable as the α-olefin and propylene, 1-butene and 4-methylpentene-1 are especially preferable. The ethylene/α-olefin molar ratio is preferably in the range of from 50/50 to 95/5.

The ethylene/α-olefin copolymer rubber can further comprises other polymerizable component, and it is especially preferred that up to 30 millimoles of 5-vinyl-2-norbornene be further copolymerized per 100 g of the whole ethylene/α-olefin units. The ethylene/α-olefin copolymer rubber is rubbery polymer obtained by random polymerization of the foregoing components. The chlorination of the copolymer rubber is accomplished, for example, according to a process in which the copolymer rubber is pulverized, the fine particles are formed into an aqueous suspension and the aqueous suspension is contacted with molecular chlorine at about 70° to about 90° C., a process in which the copolymer rubber is dissolved in a solvent stable against chlorine, such as carbon tetrachloride or tetrachloroethylene, and the resulting homogeneous solution is contacted with molecular chloride, and a process in which a chlorine compound such as N-chloroacetamide, N-dichlorosuccinimide or 1,3-dichloro-5,5-dimethylhydatoin is uniformly kneaded into the copolymer rubber by a roll or Banbury mixer and the kneaded mixture is heated at a temperature causing release of chlorine. A process comprising blowing chlorine in a halogenated solvent such as carbon tetrachloride in the presence of a radical initiator is especially preferably adopted.

The following post treatments are conducted after the chlorination reaction. In the case where the chlorination is conducted in the state of an aqueous suspension, the chlorinated ethylene/α-olefin rubber is washed with water to remove molecular chlorine and hydrogen chloride formed as a by-product, and then, the copolymer rubber is dried. In the case where the chlorination is conducted in the state of a solution, the reaction liquid is thrown into an excessive amount of a poor solvent for the chlorinated ethylene/α-olefin copolymer rubber, such as methanol, the precipitate is recovered by filtration and the recovered precipitate is washed with the above solvent and dried.

The chlorine content of the chlorinated ethylene/α-olefin copolymer rubber used in the present invention is 20 to 40% by weight, preferably 25 to 35% by weight, and the chlorination is carried out so that the chlorine content is within this range. From the viewpoint of the moldability and operation adaptability, the Mooney viscosity [$ML_{1+4}(121°\,C.)$] of the copolymer rubber is 10 to 190, preferably 20 to 150, especially preferably 30 to 120.

Carbon Black

In order to obtain desired electric characteristic values in the present invention, it is indispensable that carbon black (B) should be incorporated in an amount of 10 to 50 parts by weight, preferably 15 to 45 parts by weight, per 100 parts by weight of the chlorinated ethylene/α-olefin copolymer rubber (A). If the amount of carbon black (B) is smaller than 10% by weight based on the copolymer rubber (A), the electroconductivity is reduced and the volume resistivity is increased, and it is difficult to obtain a desired volume resistivity. If the amount of carbon black (B) is larger than 50% by weight based on the copolymer rubber (A), the electroconductivity is increased and the volume resistivity is reduced, and it is difficult to obtain a desired volume resistivity.

As the carbon black used in the present invention, there can be mentioned channel black such as EPC or MPC, furnace black such as SRF or FEF, thermal black such as FT or MT, and acethylene black. These carbon blacks can be appropriately selected and used.

Other materials used in the present invention and processing methods will now be described.

In the foam of the present invention, in addition to the chlorinated ethylene/α-olefin copolymer rubber (A) and carbon black (B) as the indispensable components, known additives such as a curing agent, a curing assistant, a foaming agent, a foaming assistant, a rubber filler, a softener, a metal activating agent, a compound having an oxymethylene structure, a scorch-preventing agent an aging-preventing agent and a processing assistant can be incorporated according to the processability and required performances.

In the foam of the present invention, a rubber other than the chlorinated ethylene/α-olefin copolymer rubber can be used in combination with the chlorinated ethylene/α-olefin copolymer rubber, so long as attainment of the intended object of the present invention is not hindered.

Triazine curing and organic peroxide curing are effectively adopted for curing the foam of the present invention.

In case of triazine curing, a triazine compound represented by the following general formula (I) is used as the curing agent:

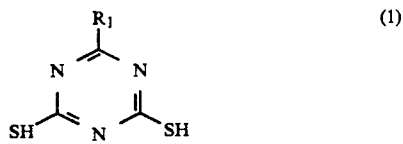

wherein $R_1$ represents $-NR_2R_3$, $-OR_2$ or $-SR_2$, in which $R_2$ and $R_3$ each represent a hydrogen atom, an unsubstituted or substituted alkyl group or an unsubstituted or substituted aryl group.

As specific examples of the triazine thiol represented by the general formula (1), there can be mentioned triazine-2,4,6-trithiol, 2-dibutylaminotriazine-4,6-dithiol, 2-phenylaminotriazine-4,6-dithiol, 2-hexylamine-triazine-4,6-dithiol, 2-diethylaminotriazine-4,6-dithiol and 2-butoxytriazine-4,6-dithiol.

The curing agent is incorporated in an amount of $1 \times 10^{-3}$ to $2.5 \times 10^{-2}$ mole, preferably $1.5 \times 10^{-3}$ to $2 \times 10^{-2}$ mole, especially preferably $3 \times 10^{-3}$ to $1.3 \times 10^{-2}$ mole, per 100 g of the chlorinated ethylene/α-olefin copolymer rubber. If the amount incorporated of the curing agent is too small and below the above-mentioned range, a cured product having a good rubbery elasticity cannot be obtained, and if the amount of the curing agent is too large and exceeds the above-mentioned range, the elongation is reduced and the cured product can hardly be put into practical use.

When a triazine compound is used as the curing agent, a curing assistant is added so as to attain a curing speed necessary for practical molding. An organic base having an acid dissociation constant (pKa) of at least 7 or a compound capable of forming such as organic base is incorporated in an amount of $5 \times 10^{-4}$ to $2 \times 10^{-2}$ mole, preferably $1 \times 10^{-3}$ to $1 \times 10^{-2}$ mole, per 100 g of the chlorinated ethylene/α-olefin copolymer rubber. Such curing assistants can be used singly or in the form of a mixture of two or more of them.

As the curing agent, there can be used 1,8-diazabicyclo(5,4,0)-undecene-7, laurylamine, benzylamine, dibenzylamine, N-methylmorpholine, dicyclohexylamine, zinc dibutyldithiocarbamate, piperizine pentamethylene-dithiocarbamate, piperizine salt pentamethylenedithiocarbamate, N-cyclohexyl-2-benzothiazolylsulfenmide, dicyclohexylamine benzoate, piperidine benzoate, dipentamethylene-thiuram tetrasulfide, tetramethylthiuram disulfide, and onium salts such as tetramethylphosphonium iodide, tetramethylammonium chloride, tetrabutylphosphonium bromide, tetrabutylammonium bromide and distearyldimethyl-ammonium chloride.

When organic peroxide curing is carried out, as the curing agent, there can be used dicumyl peroxide, 2,5-dimethyl-2,5-di(tertiary butylperoxy)hexane, 2,5-dimethyl-2,5-di(benzoylperoxy)hexane, 2,5-dimethyl-2,5-di(tertiary butylperoxy)hexyne-3, di-tertiary-butyl peroxide, di-tertiary-butylperoxy-3,3,5-trimethylcyclohexane and tertiary-butyl hydroperoxide. Among them, dicumyl peroxide, di-tertiary-butyl peroxide and di-tertiary-butylperoxy-3,3,5-trimethylcyclohexane are preferably used.

The amount used of the organic peroxide is $3 \times 10^{-4}$ to $5 \times 10^{-2}$ mole, preferably $1 \times 10^{-3}$ to $3 \times 10^{-2}$ mole, per 100 g of the chlorinated ethylene/α-olefin copolymer rubber.

When the organic peroxide is used as the curing agent, a curing assistant is preferably used in combination with the curing agent. As the curing assistant, there can be mentioned sulfur, a quinone dioxime type curing assistant such as p-quinonedioxime, a methacrylate type curing assistant such as polyethylene glycol dimethacrylate, an allyl type curing assistant such as diaryl phthalate or triallyl cyaniyrate, a maleimide type curing assistant and divinylbenzene. The curing assistant is used in an amount of $\frac{1}{2}$ to 2 moles, preferably about 1 mole, per mole of the used organic peroxide.

As the foaming agent, there can be mentioned, for example, inorganic foaming agents such as sodium hydrogencarbonate, sodium carbonate, ammonium hydrogencarbonate, ammonium carbonate and ammonium nitrite, nitroso compounds such as N,N'-dimethyl-N,N'-dinitrosoterephthalamide and N,N'-dinitropentamethylenetetraamine, azo compounds such as azodicarbonamide, azobisisobutyronitrile, azocyclohexylnitrile, azodiaminobenzene and barium azodicarboxylate, sulfonylhydrazide compounds such as benzene-sulfonylhydrazide, toluenesulfonylhydrazide, p,p'-oxybis(benzene-sulfonylhydrazide) and diphenylsulfone-3,3'-disulfonylhydrazide, and azide compounds such as calcium azide, 4,4'-diphenyldisulfonylazide and p-toluene-sulfonylazide. A nitroso compound, an azo compound and an azide compound are preferably used.

The foaming agent is incorporated in an amount of $1.0 \times 10^{-3}$ to $3.0 \times 10^{-1}$ mole, preferably $2.0 \times 10^{-3}$ to $2.0 \times 10^{-1}$ mole, per 100 g of the chlorinated ethylene/α-olefin copolymer rubber, and in general, a foamed body having an apparent specific gravity of about 0.03 to about 0.7 is formed.

As the foaming assistant to be used in combination with the foaming agent, there are used organic acids such as salicylic acid, phthalic acid and stearic acid, and urea and derivatives thereof. The foaming assistant exert functions of lowering the decomposition temperature of the foaming agent, promoting the decomposition and uniformalizing cells.

A rubber filler can be used so long as the electric characteristics are not adversely influenced. For example, finely divided silicic acid, light calcium carbonate, talc and clay can be used as the rubber filler. The rubber filler is generally used in an amount of up to 150 parts by weight, preferably up to 100 parts by weight, per 100 parts by weight of chlorinated ethylene/α-olefin copolymer rubber.

As the softener, there can be mentioned, for example, petroleum substances such as process oil, lubricating oil, paraffin, liquid paraffin, petroleum asphalt and vaseline, coal tars such as coal tar and coal tar pitch, fatty oils such as castor oil, linseed oil, rape oil, soybean oil and coconut oil, waxes such as tall oil, bees wax, carnauba wax and hydrous lanoline, fatty acids and salts thereof such as ricinoleic acid, palmitic acid, stearic acid, barium sterate and calcium stearate, synthetic polymeric substances such as a petroleum resin, a coumarone-indene resin and atactic polypropylene, ester type plasticizers such as dioctyl phthalate, dioctyl adipate and dioctyl sebacate, and microcrytalline wax, rubber substitute (factice). liquid polybutadiene, modified liquid polybutadiene and liquid thiocol.

The softener is generally incorporated in an amount of up to 100 parts by weight, preferably 70 parts by weight, per 100 parts by weight of the chlorinated ethylene/α-olefin copolymer rubber.

As the metal activating agent, there can be used magnesium oxide, a zinc salt of a fatty acid, read lead, litharge and calcium oxide. The metal activating agent is used in an amount of 3 to 15 parts by weight, preferably 5 to 10 parts by weight, per 100 parts by weight of the chlorinated ethylene/α-olefin copolymer rubber.

In order to cope with various rubber-processing steps, addition of a compound having an oxyethylene structure and a scorch-preventing agent is recommended.

As the compound having an oxyethylene structure, there can be mentioned, for example, ethylene glycol, diethylene glycol, polyethylene glycol, propylene glycol and polypropylene glycol. In general, the compound is incorporated in an amount of 0.1 to 10 parts by weight, preferably 1 to 5 parts by weight, per 100 parts by weight of the chlorinated ethylene/α-olefin copolymer rubber.

Known scorch retarders can be used as the scorch-preventing agent. For example, there can be mentioned maleic anhydride, a thioimide compound, a sulfenamide compound and a sulfonamide compound. The scorch-preventing agent is used in an amount of 0.2 to 5 parts by weight, preferably 0.3 to 3 parts by weight, per 100 parts by weight of the chlorinated ethylene/α-olefin copolymer rubber.

When an aging-preventing agent is used, the material life of the foam of the present invention can be prolonged, as in case of ordinary rubbers. As the aging-preventing agent to be used for this purpose, there can be mentioned aromatic secondary amines such as phenyl-naphthylamine and N,N'-di-2-naphthyl-p-phenylenediamine, phenolic stabilizers such as dibutylhydroxytoluene and tetrakis [methylene(3,5-di-t-butyl-4-hydroxy)-hydroxycinnamato]methane, thioether stabilizers such as bis[2-methyl-4-(3-n-alkylthiopropionyloxy)-5-t-butyl-pheny]sulfide, and dithiocarbamate stabilizers such as nickel dibutyldithiocarbamate. These aging-preventing agents can be used singly or in the form of a mixture of two or more of them.

The aging-preventing agent is incorporated in an amount of 0.1 to 5 parts by weight, preferably 0.5 to 3 parts by weight, per 100 parts by weight of the chlorinated ethylene/α-olefin copolymer rubber.

Processing assistants customarily used for rubbers can be used. For example, there can be mentioned higher fatty acids and salts and esters thereof, such as ricinoleic acid, stearic acid, palmitic acid, lauric acid, barium stearate, calcium stearate, zinc stearate, and esters thereof. The processing assistant is generally incorporated in an amount of up to about 10 parts by weight, preferably 1 to 5 parts by weight, per 100 parts by weight of the chlorinated ethylene/α-olefin copolymer rubber.

The rubber composition is prepared, for example, according to the following method. The chlorinated ethylene/α-olefin copolymer rubber, carbon black and additives such as the filler and softener are charged in a mixture such as a Banbury mixer and kneaded at a temperature of about 80° to about 170° C. for about 3 to about 10 minutes, and the curing agent, curing assistant, foaming agent and foaming assistant are additionally mixed into the kneaded mixture by using a roll such as an open roll and the mixture is kneaded at a roll temperature of about 40° to about 80° C. for about 5 to about 30 minutes. The kneaded mixture is taken out little by little to form a ribbon- or sheet-shaped rubber composition. Alternatively, the chlorinated ethylene/α-olefin copolymer rubber and additives are directly fed into an extruder heated at about 80° to about 100° C. and pelletized while taking a residence time of about 0.5 to about 5 minutes to obtain a pelletized rubber composition.

The so-prepared rubber composition is molded, cured and foamed in a mold by a press molding machine, a transfer molding machine or an injection molding machine. The mold temperature is ordinarily 150° to 220° C., and the time required for curing and foaming is 1 to 30 minutes. Furthermore, when molding is carried out by using an extruder, curing and foaming can be effected by heating the extrudate under a pressureless condition by a hot air heating tank, a glass bead fluidized bed or a microwave heating device. Moreover, curing and foaming can be effected by heating under pressure by a curing pot. In this case, the heating temperature is 150° to 270° C. and the time required for curing and foaming is 1 to 30 minutes.

The so-obtained foam has a desired volume resistivity in the range of $10^5$ to $10^{11}$ Ω-cm and retains an initial softness even after the lapse of time. Accordingly, the foam is very valuable as a roll material of facilities for office automation.

The reason why the desired volume resistivity within the above-mentioned range can be easily obtained according to the present invention has not been completely elucidated, but it is presumed that by the chlorination of the ethylene/α-olefin copolymer rubber, the affinity of the rubber component with carbon black is increased, and therefore, the dispersion of carbon black in the rubber is stabilized.

As pointed out hereinbefore, the semiconductive rubber foam of the present invention is composed of a molded body formed by curing and foaming a rubber composition comprising (A) 100 parts by weight of a chlorinated ethylene/α-olefin copolymer rubber and (B) 10 to 50 parts by weight of carbon black as indispensable components, and the volume resistivity of this foam is $10^5$ to $10^{11}$ Ω-cm.

Since the chlorinated ethylene/α-olefin copolymer rubber is contained as the indispensable component, the ozone resistance, heat aging resistance and weatherability can be maintained at high levels, and the affinity with carbon black is improved and carbon black is uniformly and stably dispersed. Namely, the dispersion state of carbon black is good, and adhesiveness and affinity of carbon black with the rubber component are good.

By incorporating carbon black as the other indispensable component in an amount of 10 to 50 parts by weight into 100 parts by weight of the chlorinated ethylene/α-olefin copolymer rubber, a desired volume resistivity of $10^5$ to $10^{11}$ Ω-cm is attained. If the amount of carbon black is smaller than 10 parts by weight per 100 parts by weight of the chlorinated ethylene/α-olefin copolymer rubber, the volume resistivity increases and exceeds the above range, and if the amount of carbon black is larger than 50 parts by weight per 100 parts by weight of the chlorinated ethylene/α-olefin copolymer rubber, the volume resistivity decreases and is often below the above-mentioned range.

The volume resistivity can be changed according to the intended use, hardness and the like even if the composition is the same, and if the amount of carbon black is within the above-mentioned range, the volume resistivity can be stably controlled within the above-mentioned range.

Thus, according to the present invention, a foam having a desired volume resistivity and retaining an initial softness (hardness)even after the lapse of time can be obtained.

The foam of the present invention is very valuably used as a roll of facilities for office automation or the like, and furthermore, the foam of the present invention can be applied to fields where a rubber or rubbery elastomer foam having a semiconductivity should be used.

EXAMPLES

The present invention will now be described in detail with reference to the following examples that by no means limit the scope of the invention.

EXAMPLE 1

According to procedures described below, a foam of the present invention was prepared and tested. At first, 4.3 l of a composition shown in Table 1 was kneaded for 5 minutes by a Banbury mixer (supplied by Kobe Seiko). The kneaded composition was wound on a 14-inch open roll (supplied by Nippon Roll). The surface temperatures of front roll/back roll were 60° C./70° C. Additives shown in Table 2 were added to the kneaded composition on this open roll.

TABLE 1

| Component | Amount (parts by weight) |
|---|---|
| chlorinated ethylene/1-butene copolymer rubber[1] | 100.0 |
| FEF carbon[2] | 45.0 |
| stearic acid | 3.0 |
| magnesia[3] | 5.0 |
| DOS[4] | 45.0 |

Note
[1]ethylene/1-butene molar ratio of 90/10, chlorine content of 27% by weight, $ML_{1+4}$ (121° C.) of 70
[2]Seast S0 supplied by Tokai Carbon
[3]Kyowa-Mag 150 supplied by Kyowa Kagaku
[4]dioctyl sebacate supplied Daihachi Kagaku

TABLE 2

| Additive | Amount (parts by weight) |
|---|---|
| curing agent[5] | 2.6 |
| curing assistant A[6] | 2.6 |
| curing assistant B[7] | 1.3 |
| foaming agent[8] | 10.0 |
| foaming assistant[9] | 3.0 |

Note
[5]dibutylaminotriazine-2,4-dithiol, ZISNET-DB supplied by Sankyo Kasei
[6]diethylene glycol/dihexylamine (1/1) mixture
[7]benzoic acid/piperidine (1/1) salt
[8]4,4'-oxybisbenzenesulfonylhydrazide, Neocellborn N1000S supplied by Eiwa Kasei
[9]urea compound, Cellpaste A supplied by Eiwa Kasei After 2 minutes' kneading, the kneaded composition was cur out in the form of a ribbon. The compound rubber was supplied into a rubber extruder having a screw diameter of 60 mm (supplied by Kakata Zoki; L/D=16; set temperatures of die/front cylinder/back cylinder =80° C./70° C./60° C.) and extrusion-molded into a tubular molded article, and the molded article was cured and foamed under a pressure of 6 kg/cm² (about 160° C.) for 30 minutes by steam pot curing. The obtained foam was machined into a hollow foamed rubber roll having an inner diameter of 5 mm and an outer diameter of 15 mm.

The foamed rubber roll was subjected to the following tests.

(1) Apparent Specific Gravity

The measurement was conducted according to the substitution method by using an automatic specific gravity meter supplied by Toyo Seiki (2) Hardness C of JIS The measurement was conducted by the spring type hardness test (C form) of the cured rubber test method of JIS K-6301.

(3) Volume Resistivity

The measurement was conducted by using VE-40 supplied by Kawaguchi Denki

Then, the foam was subjected to the accelerated weatherability test using a sunshine weather-meter. The black panel temperature was 63° C. and the test time was 1000 hours. After the accelerated weatherability test, the hardness C of JIS was measured again. The test results are shown in Table 12.

EXAMPLE 2

The procedures of Example 1 were repeated in the same manner except that a chlorinated ethylene/propylene copolymer rubber having an ethylene/propylene molar ratio of 80/20, a chlorine content of 27% by weight and $ML_{1+4}$ (121° C.) of 90 was used instead of the chlorinated ethylene/1-butene copolymer rubber used in Example 1.

The obtained results are shown in Table 12.

EXAMPLE 3

The examples of Example 1 were repeated in the same manner except that a chlorinated ethylene/1-butene copolymer having an ethylene/1-butene molar ratio of 90/10, a chlorine content of 35% by weight and $ML_{1+4}$ (121° C.) of 120 was used instead of the chlorinated ethylene/1-butene copolymer rubber used in Example 1.

The obtained results are shown in Table 12.

EXAMPLE 4

The procedures of Example 1 were repeated in the same manner except that the components shown in Table 1 were changed as shown in Table 3. The obtained results are shown in Table 12.

TABLE 3

| Component | Amount (parts by weight) |
| --- | --- |
| chlorinated ethylene/1-butene copolymer rubber | 100.0 |
| acetylene black[1] | 15.0 |
| stearic acid | 3.0 |
| magnesia | 5.0 |
| talc[2] | 50.0 |
| DOS | 30.0 |

Note
[1]Denka Black supplied by Denki Kagaku
[2]Mistron Vapor supplied by Sierra Talc

EXAMPLE 5

The procedures of Example 1 were repeated in the same manner except that the components shown in Table 1 were changed as shown in Table 4 and the components shown in Table 2 were changed as shown in Table 5.

The obtained results are shown in Table 12.

TABLE 4

| Component | Amount (parts by weight) |
| --- | --- |
| chlorinated ethylene/1-butene copolymer rubber | 100.0 |
| acetylene black | 30.0 |
| stearic acid | 3.0 |
| magnesia | 5.0 |
| clay[1] | 25.0 |
| DOS | 70.0 |

Note
Whitex #2 supplied by Freeport Kaoline Company

TABLE 5

| Component | Amount (parts by weight) |
| --- | --- |
| curing agent, ZISNET-DB | 2.0 |
| curing assistant A | 3.0 |
| curing assistant C[1] | 0.5 |
| foaming agent[2] | 8.0 |

Note
[1]Arquad 2HTF supplied by Lion-Aquzo
[2]Neocellborn N1000S supplied by Eiwa Kasei

EXAMPLE 6

The procedures of Example 1 were repeated in the same manner except that the composition shown in Table 2 was changed as shown in Table 6.

TABLE 6

| Component | Amount (parts by weight) |
| --- | --- |
| curing agent[1] | 2.7 |
| curing assistant D[2] | 3.0 |
| curing assistant E[3] | 0.1 |
| foaming agent[4] | 6.0 |

Note
[1]Dicumyl peroxide, Mitsui DCP supplied by Mitsui Petrochemical
[2]N,N'-m-phenylene dimaleimide, Vulnoc PM supplied by Ouchi Shinko
[3]Sulfur
[4]Azodicarbonamide foaming agent, Vinyfor DW #6 supplied by Eiwa Kasei The obtained results are shown in Table 12.

COMPARATIVE EXAMPLE 1

The procedures of Example 1 were repeated in the same manner except that the composition shown in Table 1 was changed as shown in Table 7.

TABLE 7

| Component | Amount (parts by weight) |
| --- | --- |
| chlorinated ethylene/1-butene copolymer rubber | 100.0 |
| talc[1] | 60.0 |
| stearic acid | 3.0 |
| magnesia | 5.0 |
| DOS | 30.0 |

Note
[1]Mlstron Vapor supplied by Sierra Talc

The obtained results are shown in Table 12.

COMPARATIVE EXAMPLE 2

The procedures of Example 1 were repeated in the same manner except that the composition shown in Table 1 was changed as shown in Table 8 and the composition shown in Table 2 was changed as shown in Table 9.

TABLE 8

| Component | Amount (parts by weight) |
| --- | --- |
| EPDM[1] | 100.0 |
| FEF carbon | 45.0 |
| stearic acid | 3.0 |
| zinc oxide[2] | 5.0 |
| paraffinic process oil[3] | 45.0 |

Note
[1]Mitsui EPT 3045 supplied by Mitsui Petrochemical
[2]Zinc Oxide No. 1 supplied by Sakai Kagaku
[3]Diana Process Oil PW-380 supplied by Idemitsu Kosan

TABLE 9

| Component | Amount (parts by weight) |
| --- | --- |
| curing assistant F[1] | 0.5 |
| curing assistant G[2] | 1.5 |
| curing assistant H[3] | 0.5 |
| sulfur | 1.5 |
| foaming agent | 10.0 |
| foaming assistant | 3.0 |

Note
[1]Dipentamethylene thiuram tetrasulfide, Nocceler TRA supplied by Ouchi Shinko
[2]Zinc di-n-butyldithiocarbamate, Nocceler BZ supplied by Ouchi Shinko
[3]2-Mercaptobenzothiazole, Nocceler M supplied by Ouchi Shinko The obtained results are shown in Table 12.

COMPARATIVE EXAMPLE 3

The procedures of Example 1 were repeated in the same manner except that the composition shown in Table 1 was changed as shown in Table 10 and the composition shown in Table 2 was changed as shown in Table 11.

TABLE 10

| Component | Amount (parts by weight) |
| --- | --- |
| chloroprene rubber[1] | 100.0 |
| FEF carbon | 45.0 |
| stearic acid | 1.0 |
| magnesia | 4.0 |
| DOS | 45.0 |

Note
[1]Denka Chloroprene M40 supplied by Denki Kagaku

TABLE 11

| Component | Amount (parts by weight) |
|---|---|
| zinc oxide[1] | 5.0 |
| curing assistant[2] | 0.35 |
| foaming agent | 10.0 |
| foaming assistant | 3.0 |

Note
[1] Zinc Oxide No. 1 supplied by Sakai Kagaku
[2] 2-Mercaptoimidazoline, Sancellar 22 supplied by Sanshin Chemical The obtained results are shown in Table 12.

TABLE 12

| | Example No. | | | | | | Comparative Example No. | | |
|---|---|---|---|---|---|---|---|---|---|
| | 1 | 2 | 3 | 4 | 5 | 6 | 1 | 2 | 3 |
| Chlorinated ethylene/ α-olefin copolymer rubber composition | ethylene/ 1-butene | ethylene/ propylene | ethylene/ 1-butene | ethylene/ 1-butene | ethylene/ 1-butene | ethylene/ 1-butene | ethylene/ 1-butene | EPDM | CR |
| molar ratio | 90/10 | 80/20 | 90/10 | 90/10 | 90/10 | 90/10 | 90/10 | | |
| chlorine content (% by weight) | 27 | 27 | 35 | 27 | 27 | 27 | 27 | | |
| $ML_{1+4}$ (121° C.) | 70 | 90 | 120 | 70 | 70 | 70 | 70 | | |
| Carbon Black | FEF carbon | FEF carbon | FEF carbon | acetylene black | acetylene black | FEF carbon | — | FEF carbon | FEF carbon |
| apparent specific gravity | 0.36 | 0.38 | 0.40 | 0.39 | 0.41 | 0.37 | 0.38 | 0.37 | 0.41 |
| hardness C of JIS | 33 | 35 | 31 | 29 | 24 | 31 | 32 | 29 | 27 |
| volume resistivity ($\Omega \cdot$ cm) | $0.8 \times 10^9$ | $1.1 \times 10^9$ | $0.7 \times 10^9$ | $1.0 \times 10^{10}$ | $5.3 \times 10^6$ | $0.8 \times 10^9$ | $1.5 \times 10^{13}$ | $0.8 \times 10^4$ | $0.9 \times 10^9$ |
| hardness C of JIS after accelerated weatherability test | 33 | 36 | 31 | 29 | 25 | 31 | 32 | 30 | 41 |

We claim:

1. A semiconductive rubber foam composed of a molded body obtained by molding a rubber composition comprising (A) 100 parts by weight of a chlorinated ethylene/α-olefin copolymer rubber having a chlorine content of 20 to 40% by weight and a Mooney viscosity [$ML_{1+4}$(121° C.)] of 10 to 190 and (B) 10 to 50 parts by weight of carbon black as indispensable components by using a curing agent and foaming agent, the volume resistivity of the foam being $10^5$ to $10^{11}$ $\Omega$-cm.

2. A semiconductive rubber foam as set forth in claim 1, wherein the ethylene unit/α-olefin unit molar ratio in the ethylene/α-olefin copolymer rubber before the chlorination is in the range of from 50/50 to 95/5.

3. A semiconductive rubber foam as set forth in claim 2, wherein the α-olefin is an α-olefin having 3 to 10 carbon atoms.

4. A semiconductive rubber foam as set forth in claim 1, wherein the carbon black is at least one member selected from the group consisting of channel black, furnace black, thermal black and acetylene black.

5. A semiconductive rubber foam as set forth in claim 1, wherein the curing agent is at least one member selected from the group consisting of triazine compounds and organic peroxides.

6. A semiconductive rubber foam as set forth in claim 5, wherein the triazine compound is represented by the following general formula:

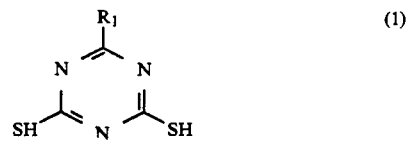

wherein $R_1$ represents $-NR_2R_3$, $-OR_2$ or $-SR_2$, in which $R_2$ and $R_3$ each represent a hydrogen atom, an unsubstituted or substituted alkyl group or an unsubstituted or substituted aryl group.

7. A semiconductive rubber foam as set forth in claim 5, wherein the triazine compound is contained in an amount of $1 \times 10^{-3}$ to $2.5 \times 10^{-2}$ mole per 100 g of the chlorinated ethylene/α-olefin copolymer rubber.

8. A semiconductive rubber foam as set forth in claim 5, wherein the organic peroxide is at least one member selected from the group consisting of dicumyl peroxide, di-tertiary-butyl peroxide and di-tertiarybutylperoxy-1,3,5-trimethylcyclohexane.

9. A semiconductive rubber foam as set forth in claim 5, wherein the organic peroxide is contained in an amount of $3 \times 10^{-4}$ to $5 \times 10^{-2}$ mole per 100 g of the chlorinated ethylene/α-olefin copolymer rubber.

10. A semiconductive rubber foam according to claim 5, wherein a curing assistant is incorporated together with the curing agent.

11. A semiconductive rubber foam as set forth in claim 1, wherein the foaming agent is at least one member selected from the group consisting of nitroso compounds, azo compounds and azide compounds.

12. A semiconductive rubber foam as set forth in claim 1, wherein the foaming agent is incorporated in an amount of 1.0 c $10^{-3}$ to $3.0 \times 10^{-1}$ mole per 100 g of the chlorinated ethylene/α-olefin copolymer.

* * * * *